US011367869B2

(12) United States Patent
Ozkan et al.

(10) Patent No.: US 11,367,869 B2
(45) Date of Patent: Jun. 21, 2022

(54) GLASS BOTTLES BASED SILICON ELECTRODE MATERIALS

(71) Applicant: The Regents of the University of California, Oakland, CA (US)

(72) Inventors: Cengiz S Ozkan, San Diego, CA (US); Mihrimah Ozkan, San Diego, CA (US); Chueh Liu, Dayton, OH (US); Changling Li, Riverside, CA (US); Wei Wang, Newport Beach, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 247 days.

(21) Appl. No.: 16/388,660

(22) Filed: Apr. 18, 2019

(65) Prior Publication Data

US 2019/0326593 A1   Oct. 24, 2019

Related U.S. Application Data

(60) Provisional application No. 62/659,925, filed on Apr. 19, 2018.

(51) Int. Cl.
*H01M 4/1395* (2010.01)
*H01M 4/38* (2006.01)
(Continued)

(52) U.S. Cl.
CPC ......... *H01M 4/386* (2013.01); *H01M 4/0428* (2013.01); *H01M 4/663* (2013.01);
(Continued)

(58) Field of Classification Search
CPC ...... H01M 4/00; H01M 4/386; H01M 4/1395; H01M 4/04; C01B 33/023
See application file for complete search history.

(56) References Cited

U.S. PATENT DOCUMENTS

| 4,226,377 A * | 10/1980 | Shelton | B02C 13/04 |
| | | | 241/186.3 |
| 2006/0051670 A1* | 3/2006 | Aramata | C01B 33/023 |
| | | | 429/218.1 |

(Continued)

FOREIGN PATENT DOCUMENTS

| WO | WO-2015179541 A1 * | 11/2015 | ........ H01M 10/0525 |
| WO | WO-2015196088 A1 * | 12/2015 | ............. C01B 32/05 |
| WO | WO-2015196092 A1 * | 12/2015 | .......... H01M 10/052 |

OTHER PUBLICATIONS

Li, C., Liu, C., Wang, W. et al. Silicon Derived from Glass Bottles as Anode Materials for Lithium Ion Full Cell Batteries. Sci Rep 7, 917 (2017). https://doi.org/10.1038/s41598-017-01086-8. (Year: 2017).*

(Continued)

*Primary Examiner* — James Lee
(74) *Attorney, Agent, or Firm* — Schwegman Lundberg & Woessner, P.A.

(57) ABSTRACT

Various embodiments provide glass bottle-based silicon electrode materials. A battery electrode includes silicon made from magnesiothermic reduction of silicon oxide derived from glass bottles and a conformal carbon coating thereon. A method of making the electrode material includes crushing glass bottles to produce crushed glass containing silicon oxide particles, mixing the silicon oxide particles with a heat scavenger to produce a mixture, magnesiothermically reducing the mixture to produce silicon, and applying a carbon coat to the silicon to produce an electrode material.

14 Claims, 14 Drawing Sheets

(51) Int. Cl.
| | |
|---|---|
| H01M 4/88 | (2006.01) |
| H01M 4/04 | (2006.01) |
| H01M 4/66 | (2006.01) |
| C01B 33/023 | (2006.01) |
| H01M 10/0525 | (2010.01) |
| H01M 4/02 | (2006.01) |

(52) U.S. Cl.
CPC ....... *H01M 4/8882* (2013.01); *H01M 4/8892* (2013.01); *C01B 33/023* (2013.01); *H01M 10/0525* (2013.01); *H01M 2004/027* (2013.01)

(56) References Cited

U.S. PATENT DOCUMENTS

| | | | | |
|---|---|---|---|---|
| 2008/0105536 | A1* | 5/2008 | Auner | C01B 9/00 |
| | | | | 204/157.43 |
| 2017/0194630 | A1* | 7/2017 | Ozkan | H01M 4/0469 |
| 2017/0194631 | A1* | 7/2017 | Favors | H01M 4/366 |
| 2017/0194632 | A1* | 7/2017 | Wang | H01M 4/621 |

OTHER PUBLICATIONS

Wong, D. P., Lien, H. T., Chen, Y. T., Chen, K. H., & Chen, L. C. (2012). Patterned growth of nanocrystalline silicon thin films through magnesiothermic reduction of soda lime glass. Green Chemistry, 14(4), 896. https://doi.org/10.1039/c2gc16459k. (Year: 2012).*

Favors, Zachary, et al., "Scalable Synthesis of Nano-Silicon from Beach Sand for Long Cycie Life Li-ion Batteries", Scientific Reports 4, (2014), 7 pgs.

Ge, Mingyuan, et al., "Porous Doped Silicon Nanowires for Lithium Ion Battery Anode with Long Cycle Life", Nano Letters 12, ACS Publications, (2012), 6 pgs.

Goodenough, John B, et al., "The Li-Ion Rechargeable Battery: A Perspective", J. Am. Chem. Soc., 135(4), (2013), 1167-1176.

Liu, Nian, "Rice husks as a sustainable source of nanostructured silicon for high performance Li-ion battery anodes", Scientific Reports 3, (2013), 7 pgs.

Luo, Wei, et al., "Efficient Fabrication of Nanoporous Si and Si/Ge Enabled by a Heat Scavenger in Magnesfothermic Reactions", Scientific Reports, 3:2222, (2013), 7 pgs.

Park, Cheol-Min, et al., "Li-alloy based anode materials for Li secondary batteries", Chemical Society Reviews, 39(8), (2010), 27 pgs.

Richman, Erik K, et al., "Ordered Mesoporous Silicon through Magnesium Reduction of Polymer Templated Silica Thin Films", Nano letters, 8(9), (2008), 3075-3079.

Wang, Wei, et al., "Hybrid carbon nanotube and graphene nanostructures for lithium ion battery anodes", Nano Energy 3, (2014), 6 pgs.

Wang, Wei, et al., "Monodisperse Porous Silicon Spheres as Anode Materials for Lithium Ion Batteries", Scientific Reports, 5: 8781, (2015), 6 pgs.

* cited by examiner

US 11,367,869 B2

GLASS BOTTLES BASED SILICON ELECTRODE MATERIALS

CROSS REFERENCE TO RELATED APPLICATIONS

This application claims the benefit of priority to U.S. Patent Provisional Application No. 62/659,925, filed Apr. 19, 2018, which is incorporated by reference herein in its entirety.

TECHNICAL FIELD

This invention relates to battery cell devices and methods. In one example, this invention relates to lithium ion batteries.

BACKGROUND

Improved batteries, such as lithium ion batteries are desired. New recyclable and environmentally friendly materials and microstructures are desired to make battery electrodes.

DETAILED DESCRIPTION

Figure 1:
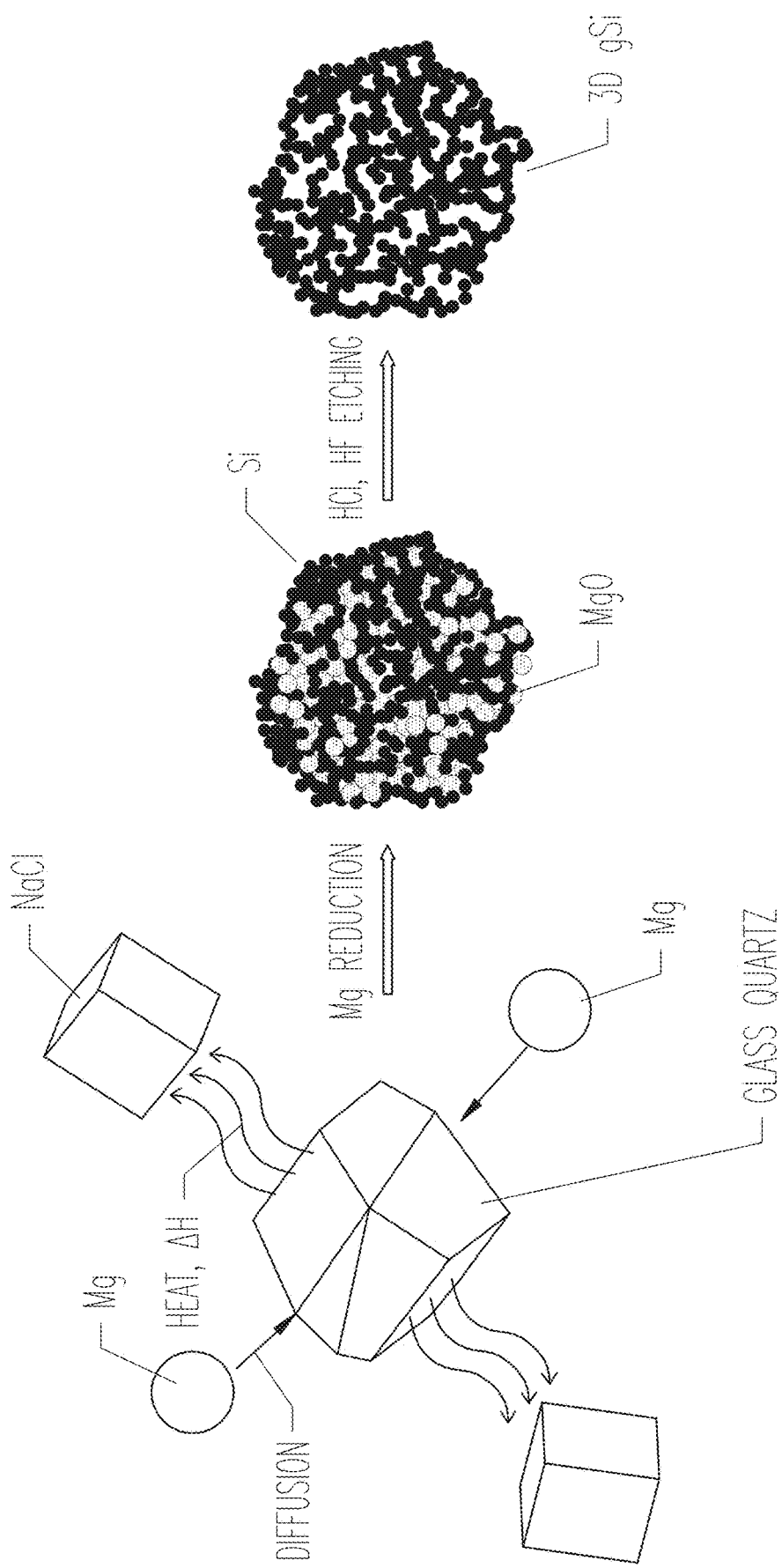
FIG. 1 is a schematic representation of a magnesiothermic reduction process processing glass bottle-based silicon.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

Overview

Green, reliable and energy-efficient lithium ion storage platforms with fast rate capability, high energy density, and high-power density are important for the new generation of electric vehicles (EVs) and plug-in hybrid electric vehicles (PHEVs). Conventionally graphite-based anodes used in commercial lithium ion batteries (LIBs) have a limited theoretical capacity of 372 mAh g-1 due to the inadequate Li-ion intercalation in $LiC_6$. Silicon may be an encouraging material for battery anodes owing to the low discharge potential (~0.1 V vs. Li/Li+) and the high theoretical capacity of 3572 mAh g-1 corresponding to the formation of $Li_{15}Si_{14}$ phase at room temperature. With commercially used $LiCoO_2$ (~145 mAh g-1) cathodes, full cells based on Si anodes lead to a 34% increase in the total capacity over that of graphite-anode based full cells.

Silicon is able to alloy with a large number of Li-ions during lithiation, resulting in a large volume expansion upwards of 300%. The lithium-induced mechanical stresses during alloying with subsequent contraction during dealloying can cause Si to fracture, which promotes the pulverization of active materials and the deterioration of the conductive network. The repeated expansion and shrinkage during lithiation and de-lithiation can destroy the integrity of solid electrolyte interphase (SEI), while increasing the decomposition of electrolyte to reform SEI on the newly exposed Si surface.

Various strategies have been utilized on alleviating the structural volume change and optimizing the electrochemical performance of Si anodes. Downscaling the dimensions of silicon structures can be an effective path to mitigate the capacity fading stemming from the cracking of Si during lithiation and de-lithiation. Particular nanostructures, such as Si nanoparticles, double walled Si nanotubes, and three-dimensional (3D) porous nano-Si can be advantageous in efficiently modifying the volume expansion of Si via the void spaces generated by their porous or hollow structures. The incorporation of electronically conductive coatings across Si can improve the cycling stability of Si anodes. Carbon coatings via thermal decomposition of carbon precursor scan act as soft buffer layers to accommodate the volume expansion of Si. In-situ polymerized conductive polymer coverings with tunable conductivity, diverse monomer chemistry and surface compatibility with electrolyte function as conductive shell-matrixes can also enhance the rate capability of the electrodes.

While a large number of routes for designing nanostructured Si with good electrochemical performance as anode materials have been established, many methods for synthesizing Si nanostructures are limited to the costly raw materials, complex procedures, and low yield of active martial. For example, pyrolysis of silane/halo-silane/polysilane precursors via chemical vapor deposition (CVD) can produce various nanostructured silicon, such as nanospheres, nanowires and nanotubes. However, the pyrolysis process consumes a large amount of energy and requires expensive and highly toxic precursors, which make it non-economical and impractical for mass manufacturing. In another example, electrochemical anodization of crystalline wafers in toxic acidic environment has been employed to produce porous silicon. Silicon wafers have also been etched into tunable silicon nanowires via metal-assisted templated and non-templated approaches. However, the high-cost electronic grade wafers coupled with the milligram-per-wafer yield of active material limit on an industry level. The hydrolysis of tetraethyl orthosilicate (TEOS) to produce nano-$SiO_2$ with subsequent reduction into Si has been investigated to generate the high-performance anode materials. However, the extensive procedure to achieve TEOS as an $SiO_2$ precursor is inefficient for industry-level manufacturing.

Magnesiothermic reduction has been demonstrated as a morphology-protected method to reduce $SiO_2$ into nanostructured silicon due to its relatively low operating temperature (~650° C., below the melting point of Si). In comparison, carbothermal reduction is used to produce metallurgical silicon at a very high temperature (>2000° C.). This high energy-consuming process melts or liquefies Si, which destroys the original morphology of $SiO_2$. The addition of NaCl effectively scavenges a large amount of heat generated during a highly exothermic reaction, which prevents the exceeded heat from surpassing the melting point of Si. The incorporation of a molten salt of $AlC_3$ to $SiCl_4$ decreases the reduction temperature to 200° C., which preserves the original structure of $SiO_2$.

Recently, silica derived from natural resources, such as rice husks, beach sand, and reed leaves, have been reduced into porous Si via Mg-reduction as anode materials with good electrochemical performance. However, the strong acid leaching and high-temperature annealing process required to remove metal ions and organic species contained in these natural precursors are time-consuming and energy-intensive, while large quantities of liquid and gaseous waste during etching and heating are produced. Additionally, the yield of $SiO_2$ is low after the whole extraction and purification process.

Here, glass bottles are used as the $SiO_2$ precursor to achieve high-purity Si with several advantages compared with the aforementioned silica sources above: (1) Glass bottles are directly utilized for reduction without pre-leaching and annealing, which offers a more environmentally-benign, energy-saving and efficient route to prepare silica. (2) Glass bottles are easily-collected and their abundance in silica without any loss due to the non-etching process result in the high yield of SiO2 as the reaction precursor. (3) Many tons of non-recycled glass ends up in the landfills aggravating the burden of waste disposal.

This work provides a facile and green avenue to convert glass waste to beneficial materials. Accordingly, glass bottles are directly converted into high purity and interconnected Si network, and the carbon coated glass bottle derive silicon (gSi) exhibits stable cycling performance and high rate capability as anode material for LIBs in this work. A Li-ion full cell can be made using gSi@C anodes and $LiCoO_2$ cathodes. This full cell demonstrates good initial cycling performance with high energy density. Compared with previously reported routes for the preparation of $SiO_2$, quartz powder derived from glass bottles can be directly used for the reduction process without pre-leaching in toxic acid and removing organic impurities at very high temperature. The content of quartz in glass is higher than those obtained from the majority of natural substances. In addition, many tons of un-recycled glass bottles produced every year may satisfy the demand for electrode materials necessary in some energy storage applications. The magnesiothermal reduction process is conducted at a relatively low temperature, which inherits the original structure of the silica obtained from crushed glass bottles application. The overall process is facile, cheap and scalable for large scale fabrication of electrode materials.

Results

Generally, silica is a common fundamental constituent obtained from sand melted together with several minerals at high temperature to form non-crystalline amorphous glass. Based on general glass ingredients, including silica content, and mineral components, such glasses are primarily classified as fused silica glass, soda-lime-silica glass, sodium borosilicate glass and lead-oxide glass. Such glasses are used in food containers, housing and building applications, electronics and appliance.

Here, we collected beverage glass bottles (corresponding to the soda-lime-silica type of glass with a high $SiO_2$ content of 72%) as a quartz source. A glass bottle was put in thick bags and crushed into raw quartz. To reduce the size of quartz, mechanical milling was done in an alumina mortar to downsize the raw $SiO_2$ quartz to micrometer scale. This was done within minutes. The milled quartz powder was then transferred into tubes and dispersed in isopropanol (IPA) by ultra-sonication, which broke the agglomeration of $SiO_2$ particles, while reducing the quartz into smaller size on nanometer and micrometer scales. The dispersion was then left to the settling process. The massive quartz particles precipitated to the bottom, while the lightweight quartz particles were small enough to remain suspended in IPA. These suspended particles were collected and assumed a bright white appearance in stark. Compared with the quartz sources derived from natural substances, the resultant glass powder was directly used as an $SiO_2$ precursor without additional leaching and annealing processes. This simple and straight route to achieve relatively high-purity $SiO_2$ is favorable for large-scale production.

The dried glass powder was mechanically milled and ground with sodium chloride (NaCl, >99.5%, Fisher Scientific) in a weight ratio of 1:10 (w/w). The incorporation of NaCl acted as a heat scavenger to halt the reaction temperature rise at 801° C. during fusion, which assisted in preserving the morphology of $SiO_2$ particles by maintaining the reaction below melting point of $SiO_2$, as illustrated in FIG. 1. The well-mixed SiO2:NaCl powder was immersed in DI $H_2O$ and ultrasonicated for 2 hours with subsequent vigorously stirring at 60° C. for 3 hours. The solution was then dried at 105° C. in vacuum oven to remove the water. Dried $SiO_2$:NaCl was grounded to pulverize NaCl crystals and mixed with Mg (99.5%, #325 mesh, Sigma Aldrich) powder in a 1:0.83 $SiO_2$:Mg weight ratio followed by vortexing for ample mixing. The resultant powder was loaded into a SS 316 Swagelok-type reactor in Ar-filled VAC Omni-lab glovebox (H2O<0.5 ppm, O2<0.5 ppm), and then immediately loaded into a MTI GSL-1200X 1" diameter quartz tube and purged with argon. The reactor was heated to 700° C. at a heating rate of 5° C. and held for 6 hours to ensure the complete reduction of $SiO_2$.

After cooling down to room temperature, the resulting product was first washed with DI $H_2O$ several times to remove NaCl, and then etched with 2M HCl for 2 hours under stirring to remove excessive Mg, unwanted $Mg_2Si$ and MgO. The $MgCl_2$ produced after etching can optionally be recycled back to Mg by electrolysis, which is a sustainable process for the reproduction from waste to raw material. The resulting dispersion was centrifuged and further etched with 2 wt. % HF in tubes to remove the unreacted $SiO_2$. The gSi powder was finally rinsed several times with DI $H_2O$ and ethanol and dried under vacuum for 6 hours at 105° C. The yield of gSi reduced from glass powder was close to the theoretical yield value of 46.7 wt %, which offers an option for Si production on the industry level.

Figure 2A:
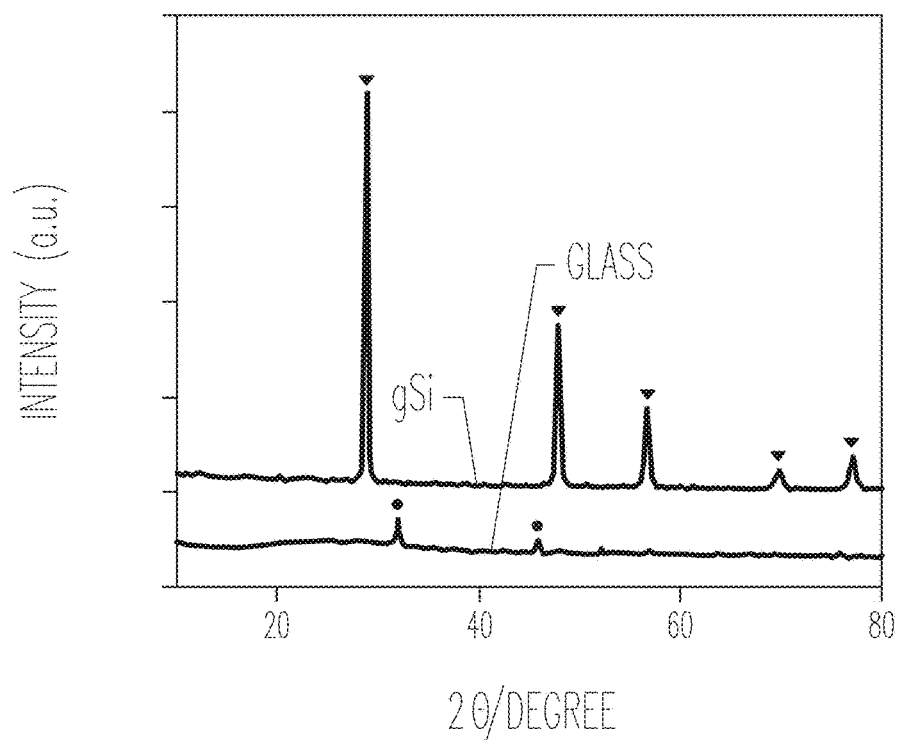
FIG. 2A depicts x-ray powder diffraction (XRD) data of pre-reduction milled glass powder and post-reduction glass derived-silicon (gSi).

The purities and phases of small size glass powder and as-reduced gSi were examined by X-ray diffraction (XRD) measurements, shown in FIG. 2A. The weak XRD peaks associated with glass powder indicate the as-prepared quartz powder included minor by-products. The XRD spectra of gSi demonstrates narrow and sharp peaks without amorphous scattering, suggesting the successful reduction from glass quartz to high degree crystallinity of Si. The peaks at 2θ of 28.8°, 47.8°, 56.7°, 69.7° and 77.1° represent (111), (220), (311), (400) and (331) planes, respectively. Raman spectroscopy (FIG. 2B) was carried out to further verify the compositions of the glass powder and glass silicon (gSi). The sharp peak at 521.06 cm$^{-1}$ signifies the relatively high-purity of as-reduced gSi in FIG. 2B.

Scanning electron microscopy (SEM) micrographs were used to describe the structures and morphologies of the obtained glass powder and gSi. The milled $SiO_2$ powder displayed a highly irregular-shape morphology with the particle size ranging from micrometer to nanometer scale as shown in FIGS. 3A-3D. Quantitative analysis obtained from the Energy Dispersive X-ray Spectroscopy (EDS) of quartz powder revealed the impurities may include lime (CaO), sodium oxide ($Na_2O$) and alumina ($Al_2O_3$), which are the common mineral components for soda-lime-silica glass.

After reduction, the particles remained irregular in shape owing to the morphology-protected Mg reduction process at a relatively low reaction temperature. The gSi had slightly reduced size distribution and partial porosity existing in gSi compared with the solid bulk $SiO_2$, shown in FIGS. 3C-3D. The resulting cross-linked gSi networks with void spaces are attributed to the breakdown of the large particles during reaction while acid-etching to remove MgO and $Mg_2Si$ within the original solid structure.

EDS showed the weight occupancy of elements present in the gSi. The quantitative analysis revealed Si is the most dominant element, with a low residue of Mg, and the absences of metallic impurities imply that those oxides are reduced by magnesium, and then etched by HCl and HF. The existence of carbon in reduced silicon may increase the network conductivity for battery applications.

Figure 4A:
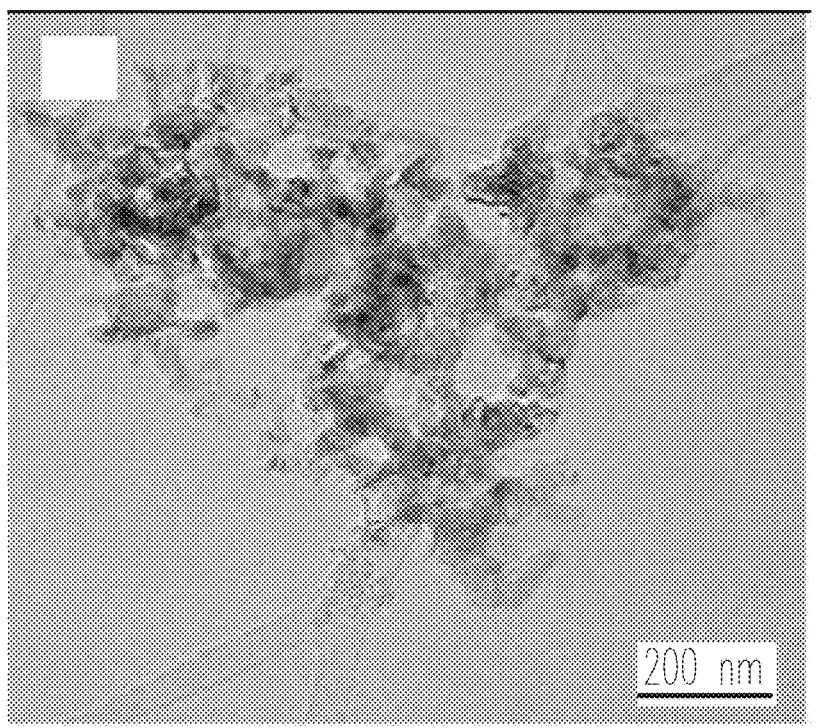
FIGS. 4A-4C show transmission electron microscopy (TEM) and SEM images of gSi.
Figure 4B:
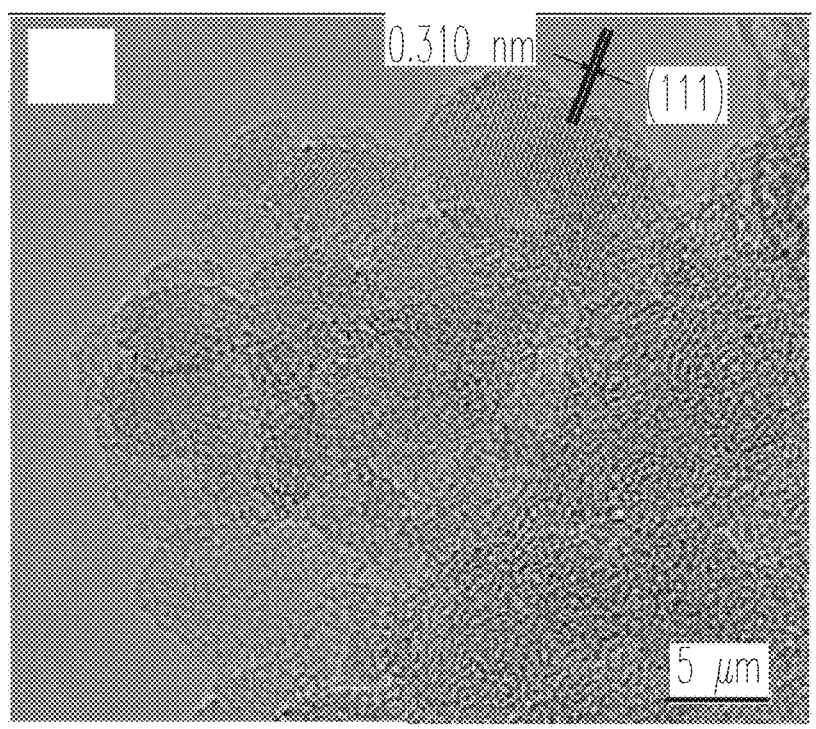

Transmission electron microscope (TEM) was carried out to further examine the structural information of glass silicon. FIG. 4A shows that gSi includes interconnected 3-D gSi networks with a particle size from ~50 nm to micro level, rather than the solid structure. This bridge-like interconnectivity is created by the selective removal of embedded MgO and $Mg_2Si$ in the gSi particles via acid etching. The existence of the partially internal porosity is available for buffering the volume expansion of Si during lithiation, while the SEI is well preserved, leading to less capacity decay resulting from the pulverization of active materials and the regeneration of SEI on exposed Si. High-resolution TEM (HRTEM) and selected area electron diffraction pattern signified the highly crystalline nature of the gSi due to the d-spacing of 0.310 nm as shown in FIG. 4B.

Figure 4C:
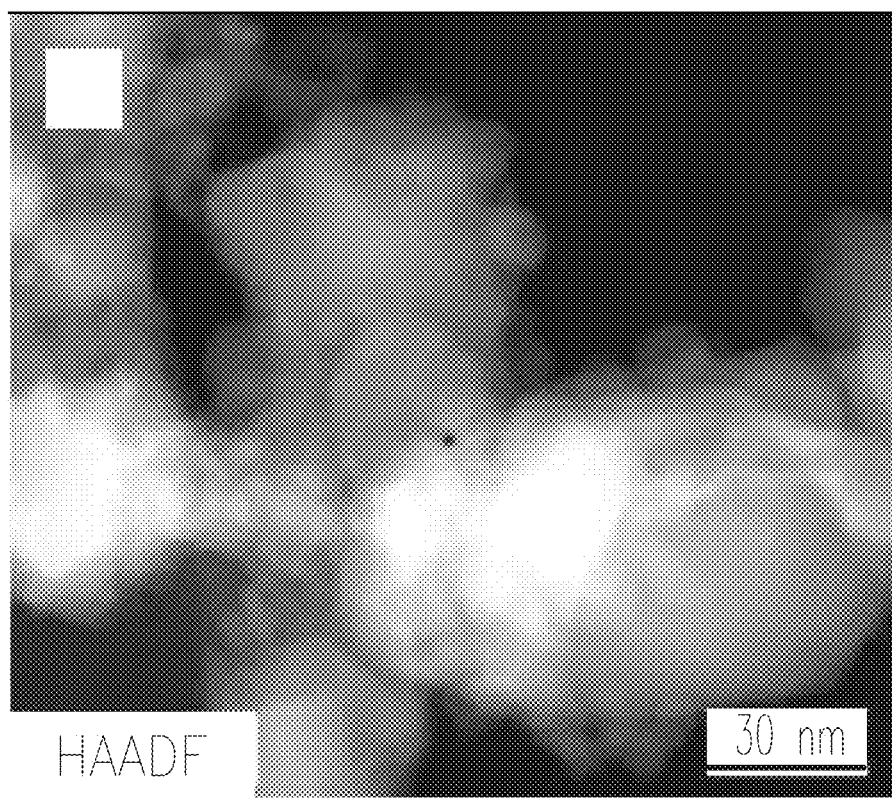
Figure 5A:
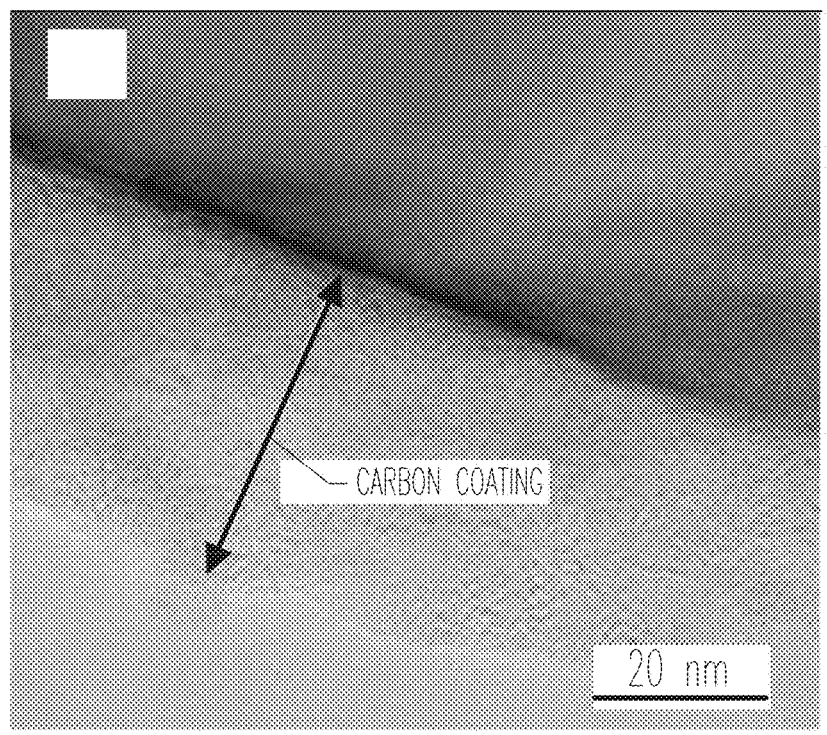
FIGS. 5A-5B show TEM images of gSi particles with a conformal carbon coating.
Figure 5B:
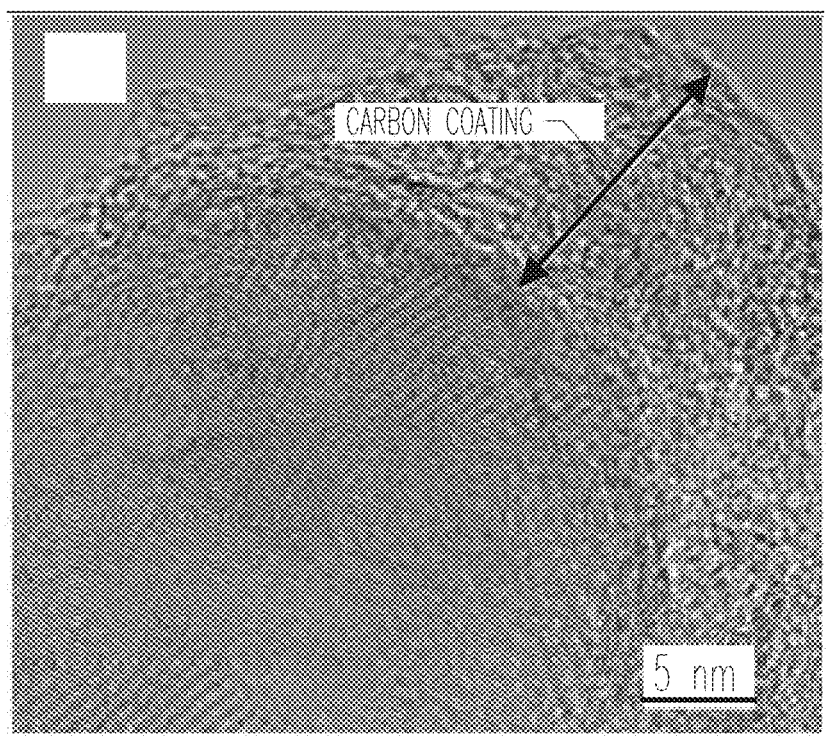

Scanning transmission electron microscope (STEM) verified the small particle size of the connected Si, while the high-angle annular dark-field imaging (HAADF) demonstrates the high purity of the reduce Si, shown in FIG. 4C. Despite some void spaces generated by gSi network that can accommodate volume change during lithiation, the low conductivity of Si limited its fast charge-discharge capability. Thus, a conformally amorphous carbon coating with a thickness of 8-25 nm was introduced across all surfaces of gSi particles via CVD as shown in FIGS. 5A-5B.

The gSi powder was loaded in a quartz boat and placed in the center of quartz tube furnace purged with Ar/H2 mixture. Acetylene ($C_2H_2$) was introduced to form the C-coating at 950° C. The weight ratio of Si-to-C was about 80:20, calculated by the weight variation before and after C-coating. STEM and HAAF of the silicon carbon composite (gSi@C) showed the uniform distribution of a carbon coating surrounding gSi. The seamless connection between C-coating and gSi improved the electrical conductivity of the gSi@C composite while mitigating the volume change of silicon by the carbon buffer shell.

Figure 6A:
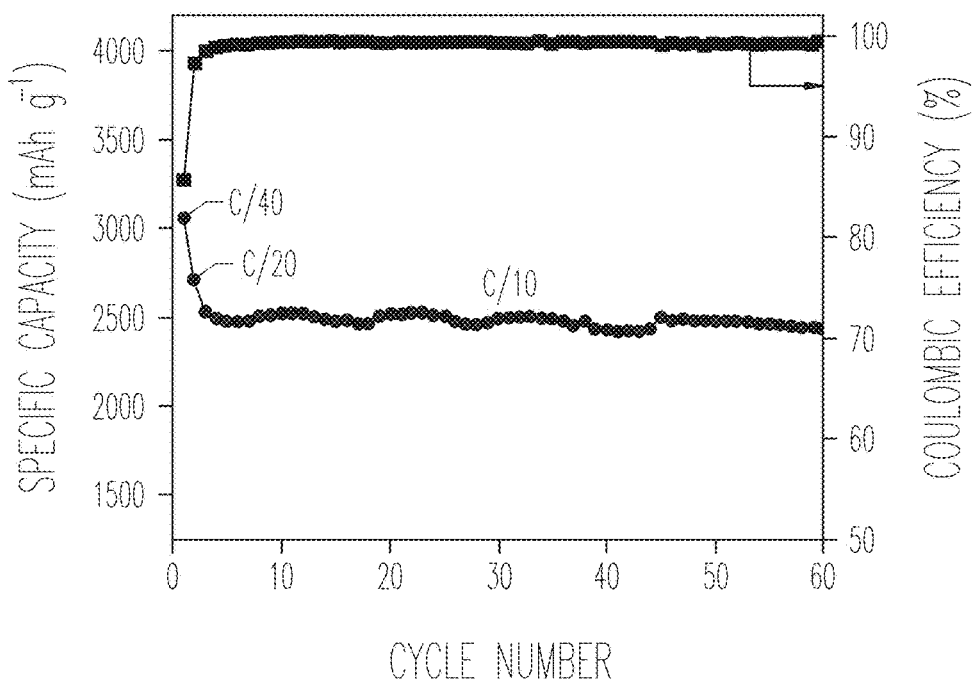
FIGS. 6A-6E show graphical representations of gSi electrode performance, including efficiency and charge-discharge profiles.
Figure 6B:
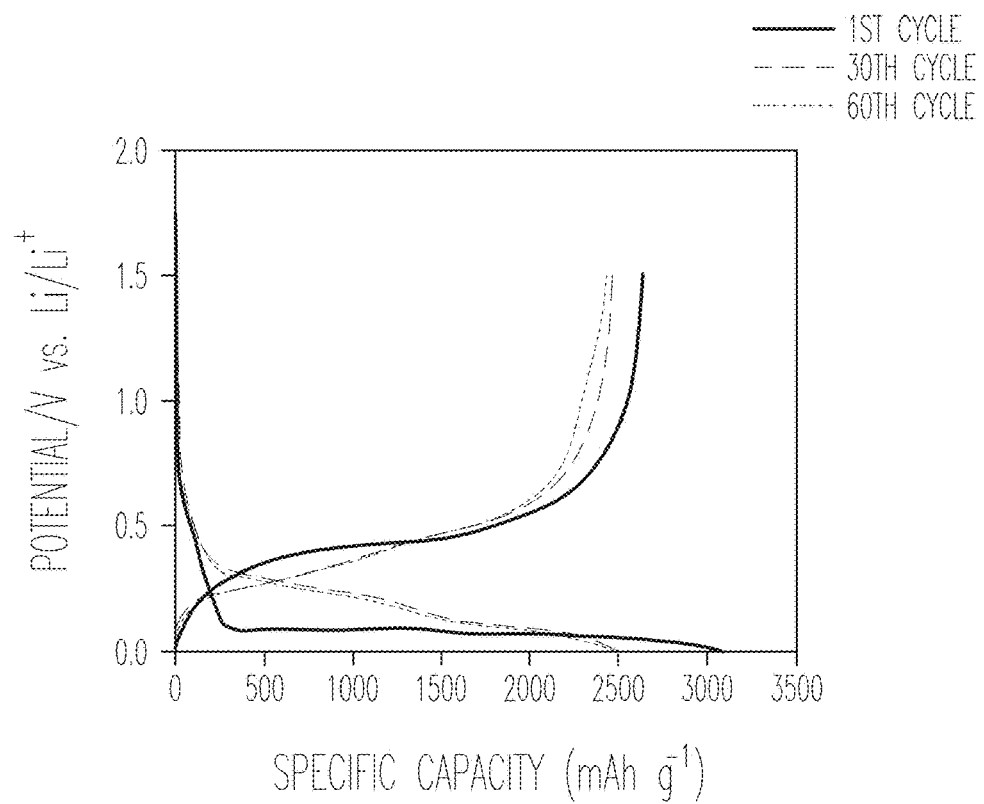

Button-type half-cell batteries were assembled in an Ar-filled glove box ($O_2$<0.10 ppm, $H_2O$<0.5 ppm) with gSi@C as the anode material and pure Li-metal as the counter-electrode. Anode electrodes comprised 70 wt. % gSi@C as active material, 20 wt. % PAA as binder, and 10 wt. % carbon black as conductive additive. A porous polypropylene membrane (Celgard 3501) was used as the separator. The electrolyte contained 1M $LiPF_6$ dissolved in a mixture of fluoroethylene carbonate (FEC) and dimethyl carbonate (DMC) in a volume ratio of 1:1. The gSi@C electrodes demonstrated a discharge capacity of 2936 mAh g-1 with a Coulombic efficiency of 85% at C/40 (1 C=3.6 A g-1) for the 1st cycle, shown in FIG. 6A. After the 2nd cycle at C/20, the battery showed consistent current-potential behaviors for the subsequent cycles at C/10. The capacity faded very slightly and demonstrated a capacity ~2500 mAh g-1 over 60 cycles as supported in FIG. 6B. The Coulombic efficiency calculated from all the cycles excluding the 1st cycle is >99%, which suggests the excellent reliability and reversibility for the gSi@C half cells.

Figure 6C:
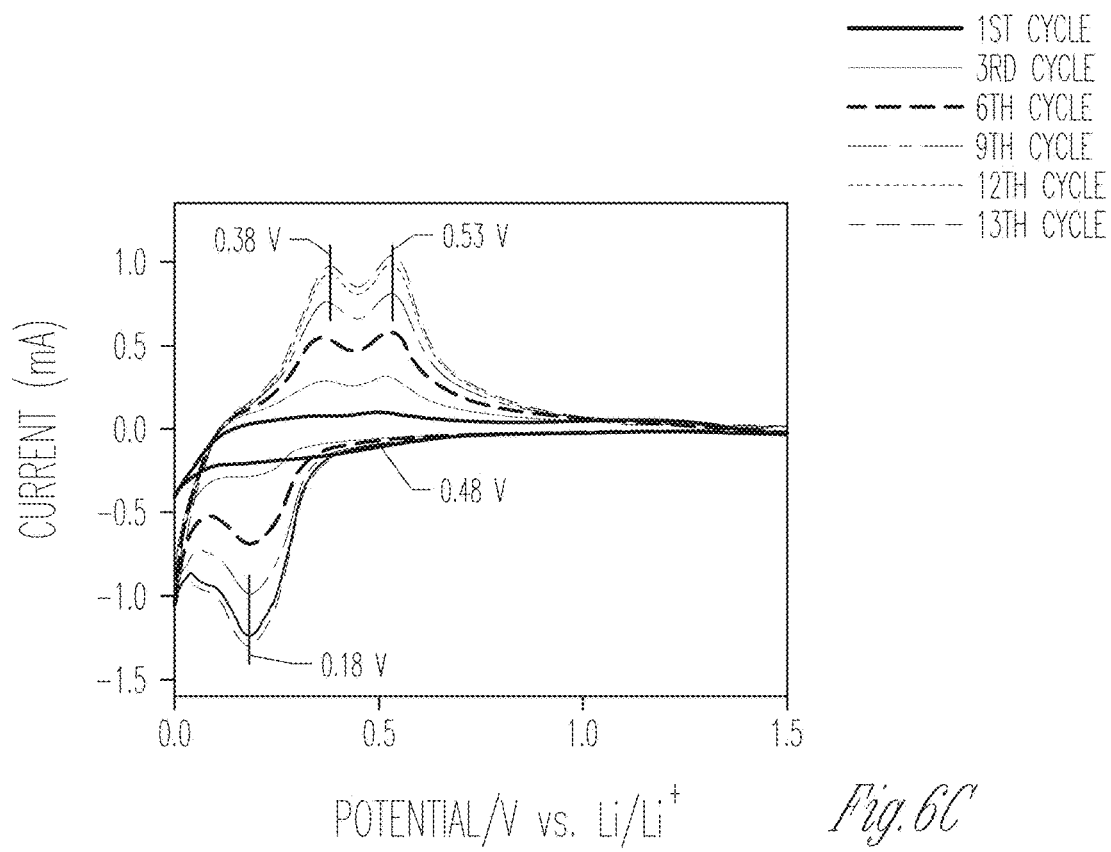

Cyclic voltammetry (CV) was tested in a voltage window range of 0.01 to 1.5 V (vs. Li+/Li) with a scan rate of 0.2 mV sec-1 as shown in FIG. 6C. The first discharge curve showed a weak peak around 0.48 V and disappeared in the subsequent cycles, which demonstrated the Li-ions were consumed to form stable SEI components ($Li_xSiO_y$, lithium ethylene discarbonate and LiF). The peaks (0.18 V and 0.10 V) associated with lithiation and the peaks (0.38 V and 0.53 V) corresponding to delithiation increased and coincided at the 12th and 13th cycles, which suggested a kinetic enhancement process for stabilizing active materials.

Figure 6D:
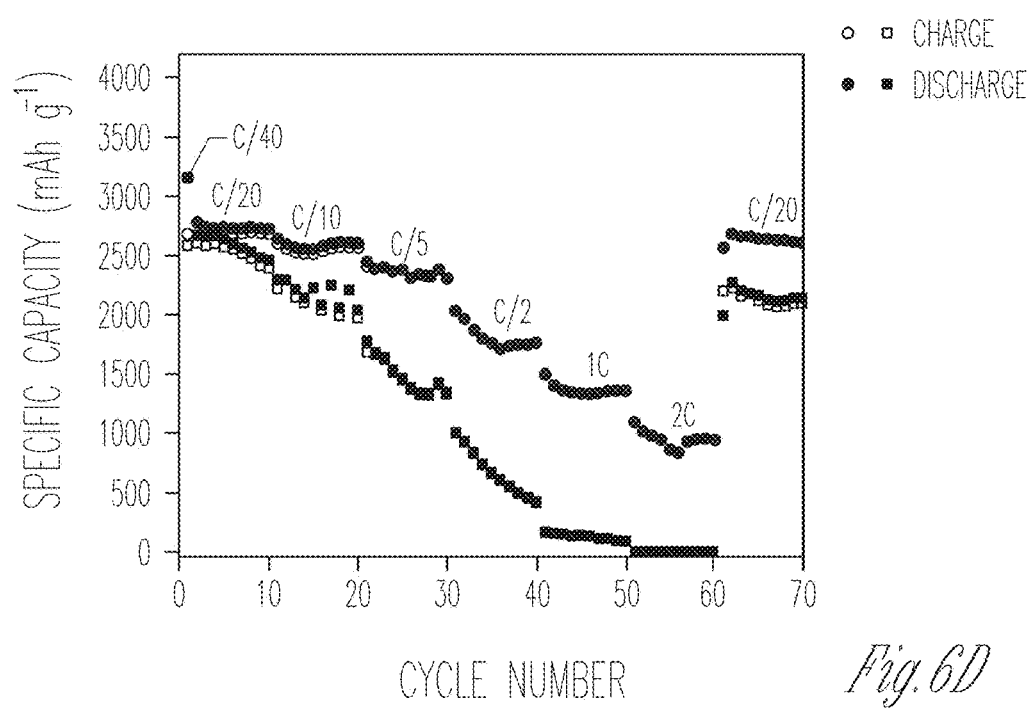
Figure 6H:
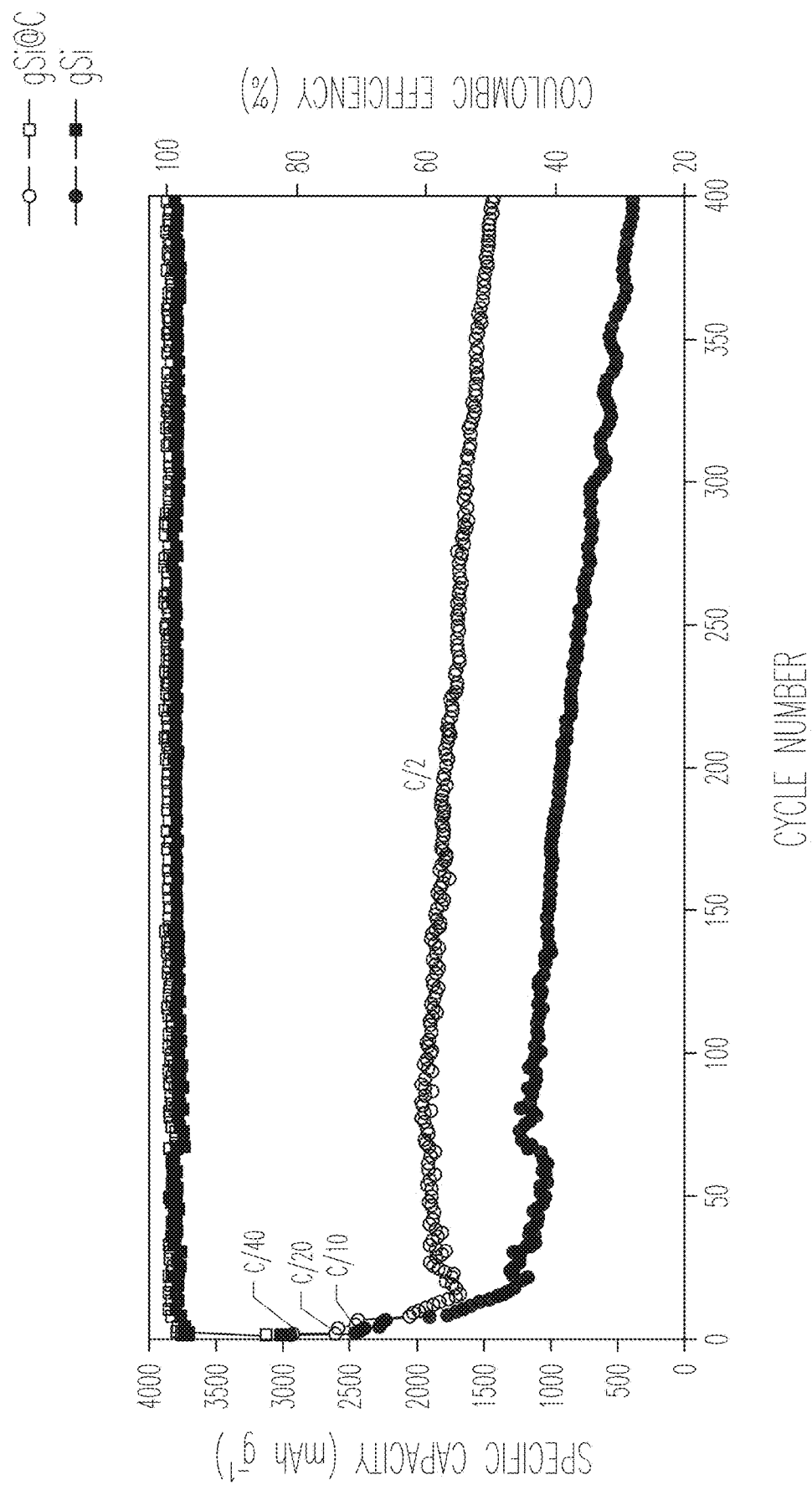

Conformal carbon coating was been verified to be an effective route to improve cycling stability and rate capability. Rate capabilities of gSi@C and gSi anodes were demonstrated with different current densities measured from C/20 to 2 C in FIG. 6D. Even up to 2 C, the gSi@C electrodes showed a much higher capacity of ~1000 mAh g-1 over that of gSi electrodes, which signified the substantial enhancement of conductive coatings on rate capability of Si anodes. For long-term cycling, the gSi@C electrodes were properly activated at 40/C, 20/C and 10/C at the initial cycles to achieve a stable SEI as confirmed by CV measurements (FIG. 6e). After the kinetic enhancement was completed at low current densities, the gSi@C anodes were cycled at a higher C-rate of C/2 and exhibited a reversible capacity of ~1420 mAh g-1 with capacity retention of 72% (Coulombic efficiency of >99.5%) after 400 cycles.

In comparison, non-carbon coated gSi electrodes presented a lower capacity of 796 mAh g-1 with capacity retention of 20% (corresponding to Coulombic efficiency of 98.9%) after the same cycling process. The cycling results of gSi@C electrodes were comparable to several reported Si anodes via Mg-reduction. This performance difference between gSi@C and gSi anodes was possibly due to the low conductivity of non-carbon coated gSi, leading to insufficient charge transfer between gSi and the micro-level carbon black within the electrode. Moreover, the carbon coating surrounding gSi improved the cycling stability of anodes, which was confirmed by the higher capacity retention and Coulombic efficiency of gSi@C electrodes over that of pure gSi after 400 cycles.

To further characterize the practical capability of the as-prepared gSi anodes, a full cell comprising gSi@2 C as anode and LiCoO$_2$ (provided by TET USA Corporation) cathode was fabricated. Based on a theoretically optimal total capacity of a full cell, the capacity ratio of anode to cathode was expected to be close to 1:147.48. In this work, the gSi@C anodes with a Si loading of ~0.5 mg cm-2 demonstrated a reversible capacity of ~1800 mAh g$^{-1}$ at C/2 (1 C=3.6 A g-1) over the first 50 cycles, while the LiCoO$_2$ cathodes with a mass loading of ~5.4 mg cm-2 show a reversible capacity of ~160 mAh g-1 at C/2 (1 C=163 mA g-1). The practical capacities of gSi@C and LiCoO$_2$ in half cells were calculated to be 0.900 mAh cm$^{-2}$ mAh and 0.865 mAh cm$^{-2}$. Accordingly, the actual capacity ratio of Si anode to LiCoO2 cathode was 1.04:1, which suggests this gSi@C/LiCoO2 full cell design iwa suitable for evaluation of anode and cathode effects on cycling stability.

Figure 7A:
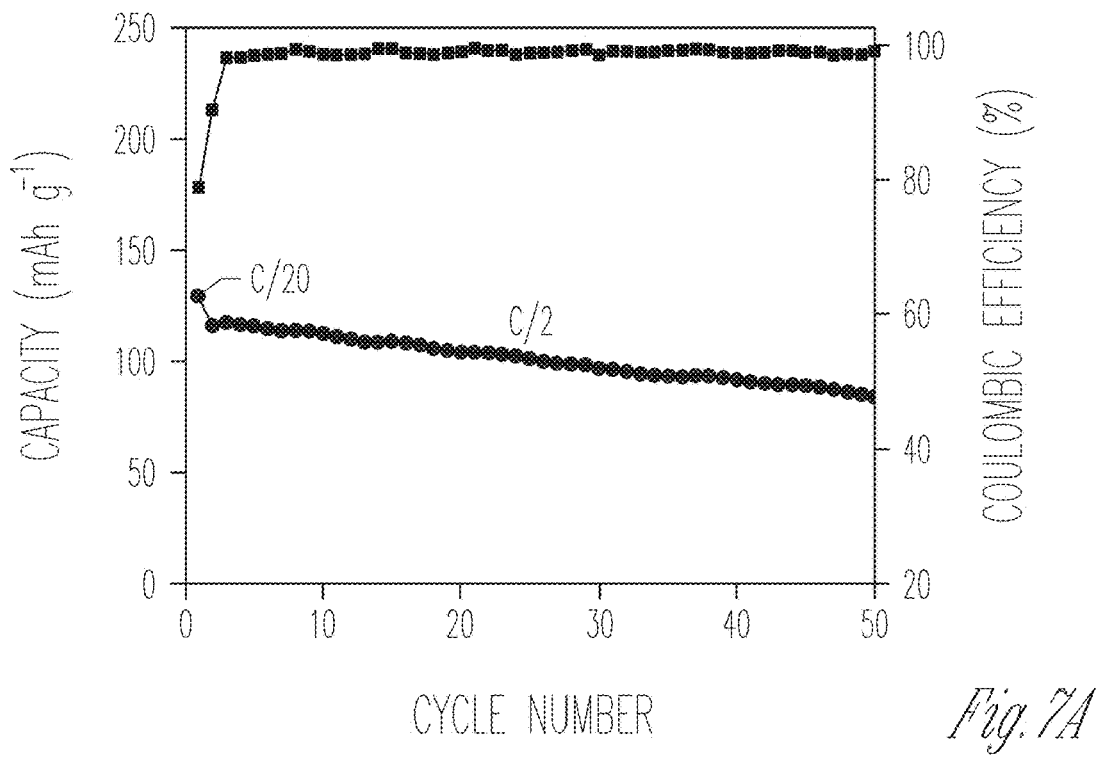
FIGS. 7A-7B show graphical representations of gSi electrode cycling performance.

The slightly higher Si content was favorable to prevent the anodes from over-lithiated during full-cell charge. The cycling performance of the full cell was measured with a voltage window range from 2.7 to 4.3 V as shown in FIG. 7A. The initial cycle was tested at C/20 for the proper activation of active materials, and a total capacity of ~130 mAh g$^{-1}$ (corresponding to a Coulombic efficiency of 78.9%) was displayed. (Note that the capacity of full cell was calculated only based on the total mass of Si and LiCoO$_2$.) In the subsequent cycles, the capacity gradually decreased from 116 to 85 mAh g$^{-1}$ at C/2 until the 50th cycle. An energy density of 460 Wh kg$^{-1}$ was demonstrated by this full cell for the first cycle. Even after 50 cycles, the cell assembly still exhibited an energy density of 298 Wh kg$^{-1}$, which is comparable to those of reported full cells based on Si anodes. If the masses of binders (PAA, polyvinylidene fluoride), carbon black and current collectors (Cu and Al foils) for gSi@C anodes and LiCoO$_2$ cathodes are also included, the full cell showed an energy density of 139 Wh kg$^{-1}$ for the 1st cycle with 65 Wh kg-1 over 50 cycles.

Discussion

Electrochemical impedance spectroscopy (EIS) was used to characterize the electrochemical performance of the gSi@C anodes. A small sinusoidal of 10 mV was applied to gSi@C anodes and the resultant complex impedance was measured in a frequency range between 100 mHz and 1 MHz. The impedance information was modeled using an electrical equivalent circuit shown in FIG. 8A. The real axis interception at high frequency, also known as equivalent series resistance (Rs or ESR), denotes the ionic resistance of the electrolyte in summation with the electronic resistance of the active material within the electrode. Rs declines for the first 7 cycles and then stabilizes thereafter in FIG. 8B and Table 1 Below.

TABLE 1

| | Fitted equivalent circuit elements of gSi@C for 9 cycles. | | | | | | | | | | | | | |
|---|---|---|---|---|---|---|---|---|---|---|---|---|---|---|
| Cycles | ESR | $R_{int}$ | $R_{SEI}$ | $R_{ct}$ | $Q_{int}$ | $n_{int}$ | $Q_{SEI}$ | $n_{SEI}$ | $Q_{dl}$ | $n_{dl}$ | $Q_{w1}$ | $n_{w1}$ | $Q_{w2}$ | $n_{w2}$ |
| 1 | 19 | 7 | 27 | 100 | 0.000007 | 0.8 | 0.00002 | 0.83 | 0.00025 | 0.68 | 0.05 | 0.65 | 0.01 | 0.27 |
| 2 | 18 | 5 | 21 | 70 | 0.000007 | 0.77 | 0.00008 | 0.75 | 0.00035 | 0.75 | 0.05 | 0.65 | 0.015 | 0.3 |
| 3 | 17 | 3.5 | 11 | 42 | 0.000007 | 0.77 | 0.0001 | 0.75 | 0.00035 | 0.75 | 0.055 | 0.75 | 0.025 | 0.35 |
| 4 | 17 | 2.5 | 7 | 39 | 0.000007 | 0.77 | 0.00015 | 0.75 | 0.0004 | 0.71 | 0.055 | 0.8 | 0.03 | 0.4 |
| 5 | 17 | 2.5 | 9 | 37 | 0.000007 | 0.77 | 0.00015 | 0.75 | 0.00045 | 0.71 | 0.055 | 0.8 | 0.035 | 0.45 |
| 6 | 17 | 2.5 | 9 | 28.5 | 0.000007 | 0.77 | 0.0002 | 0.75 | 0.00055 | 0.71 | 0.06 | 0.8 | 0.04 | 0.5 |
| 7 | 17 | 2 | 8 | 14 | 0.000007 | 0.77 | 0.0003 | 0.7 | 0.0008 | 0.71 | 0.08 | 0.85 | 0.05 | 0.55 |
| 8 | 17 | 1.5 | 8 | 15.5 | 0.000007 | 0.77 | 0.0004 | 0.7 | 0.0008 | 0.7 | 0.09 | 0.9 | 0.055 | 0.55 |
| 9 | 17 | 1.5 | 8 | 12 | 0.000007 | 0.77 | 0.0004 | 0.65 | 0.001 | 0.7 | 0.09 | 0.9 | 0.055 | 0.55 |

The high frequency semicircle represents the resistance of SEI layer (RSEI) coupled with resistance stemming from the imperfect contact between metal current collector and active materials (RINT). The RSEI+INT decreases in diameter as the cycle increases, while the semicircle at mid frequency drops sharply for the first 7 cycles and then stabilizes, indicating the stabilization of charge transfer impedance as shown in FIG. 8C. Interfacial impedance remains constant as cycling, which signifies the contact impedance among active particles and current collect is independent with cycling. This phenomenon can be attributed to the buffering effect of carbon coating on the Si volume expansion. Besides the high frequency semicircle (corresponding to RSEI+INT) and the mid semicircle (owing to charge transfer impedance between electrolyte and electrode), another distinct arc, known as the low-frequency (<20 MHz) Warburg impedance tail, represents impedance resulting from diffusion of ions into the active materials. This parameter is related to the diffusion of lithium into gSi@C and salt transfer in the electrolyte. The arcs show big difference for the first 7 cycles, while the tails of 8th and 9th closely overlap, confirming the anodes tend to stabilize as cycling.

Effective strategies have been utilized to alleviate the volume change of gSi particles during lithiation/delithiation and improve the cycling stability. First, the addition of a large amount of NaCl to glass quartz power produces cross-liked structure during the highly exothermic magnesium reduction process. The reaction process generates a large amount of heat as shown in Equations 1-2 as follows:

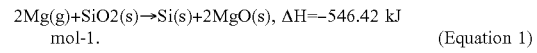

2Mg(g)+SiO2(s)→Si(s)+2MgO(s), ΔH=−546.42 kJ mol-1. (Equation 1)

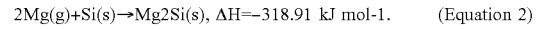

2Mg(g)+Si(s)→Mg2Si(s), ΔH=−318.91 kJ mol-1. (Equation 2)

The continuously feeding heat can cause the fusion of silicon, which destroys its original morphology and leads to aggregation of Si particles. However, the NaCl is used to cover SiO2 particles and behave as heat scavenger to absorb a large amount of heat for self-fusion, which has been verified to effectively protect the surface morphology of Si after reduction. NaCl is low cost, non-toxic and easily recycled to use. The etching of byproduct MgO and Mg2Si within Si structure generates the interconnected Si network with empty spaces, which mitigates volume change of silicon during alloying and improves Li-ions transfer into the active material. Second, a conformal carbon coating on the surface of gSi not only acts as buffer layer for accommodating volume expansion, but also enhances the rate capability of the electrodes. Moreover, the FEC-containing electrolyte assists the formation of SEI thin films with superior surface properties on Si particles compared to the thicker films formed in FEC-free electrolyte, and the presence of FEC lowers the impedance in electrolyte solutions, which reduces the irreversible capacity of the electrodes.

Methodology—Materials Synthesis

Collected beverage glass bottles were first sealed in several thick bags and crushed into small pieces by hammer. Crushed glass was hand-milled in an alumina mortar for several minutes, transferred into tubes with ultrasonication for 2 hours in isopropanol (IPA), and then left for settling big quartz down for 2 hours. Light-weight suspended quartz particles in IPA were collected and dried at 90° C. under vacuum for 2 hours. To sufficiently utilize the raw materials, the remaining big pieces of quartz were further milled into small size particles.

Dried small glass powder was mixed with NaCl (>99.5%, Fisher Scientific) in a weight ratio of 1:10 (3 g:30 g, w/w) and milled in an alumina mortar. The well-mixed $SiO_2$:NaCl powder was added in deionized (DI) $H_2O$ and ultrasonicated for 2 hours with subsequent stirring for 3 hours. The mixture was dried overnight at 105° C. in vacuum oven to remove water. The resulting SiO2:NaCl powder was ground with Mg (99.5%, #325 mesh, Sigma Aldrich) in a weight ratio of 1:0.83 (Si:Mg:3 g:2.49 g, w/w).

The well-mixed powder was loaded into SS 316 Swagelok-type reactors in an argon-filled VAC Omni-lab glove box (<0.5 ppm $H_2O$, <0.5 ppm $O_2$). The reactors were loaded into a MTI GSL-1200X quartz tube furnace and purged with argon. The furnace was ramped to 700° C. with a heating rate of 5° C. $min^{-1}$, held for 6 hours at 0.5 sccm argon environment and cooled to room temperature. The resultant powder was washed with DI $H_2O$ and ethanol several times to remove NaCl, followed by etching unwanted MgO and Mg2Si in concentrated HCl, followed by subsequent washing with DI $H_2O$. Unreacted $SiO_2$ was removed by etching in 5% HF for 1 hour and washed with DI $H_2O$ and ethanol. It was then dried under vacuum for 4 hours at 90° C. The yield of high-purity glass bottle derived silicon (gSi) was 40.0-40.3 wt %.

Thin carbon layer coated gSi (gSi@C) was formed by chemical vapor deposition (CVD). The dried and milled gSi powder was loaded in a quartz boat and transferred into the center of a quartz tube furnace. 30 sccm $C_2H_2$ was introduced and carried by $Ar/H_2$ (150/50, sccm) to produce an amorphous carbon coating across the gSi surface at 950° C. for 15 minutes. The Si-to-C weight ratio was calculated to be 4:1 based on the weight variation before and after carbon coating.

Methodology—Material Characterization

The surface morphology was investigated using optical microscopy, scanning microscopy (SEM; Leo-Supra, 1550) with X-ray energy-dispersive spectroscopy (EDS). Transmission electron microscopy (TEM. Titan Themis 300) operated at 300 KV was used to further characterize the purity and morphology of gSi and gSi@C. The TEM samples were prepared by dispersing the powder in water for 15 minutes, diluted and then dropped onto TEM grids. The phase identification was performed by X-ray diffraction (XRD, PANalytical Empyrean) from 10° to 80°. Raman spectroscopy (Renishaw DXR) with a 532 nm laser (8 mW excitation power, 100× objective lens) source was conducted to check the purity of gSi. Electrochemical impedance spectroscopy (EIS) analysis is obtained with a Biologic VMPs.

Methodology—Electrochemical Measurements

The anode electrodes were prepared by doctor-blading a slurry on pre-cleaned copper foil with a pre-area mass loading for 0.5-0.6 mg $cm^{-2}$. The slurry contained 70% active material (gSi@C), 20% PAA binder and 10% conductive additive (carbon black). A button-type (CR 2032) half-cell configuration was used for the electrochemical measurements. Cells were assembled in an Argon-filled VAC Omni-lab glovebox with oxygen and H2O level below 0.5 ppm. Pure Li metal was used as the counter electrode for half-cell tests. Full cells were prepared and evaluated in TET USA Corporation facility with custom made LiCoO2 (lithium cobalt oxide) cathodes with a LiCoO2 mass loading of 5.3-5.5 mg cm-2. A Celgard 3501 porous PP membrane was used as the separator. The electrolyte comprising 1 M LiPF6 in fluoroethylene carbonate and dimethyl carbonate (FEC:DMC=1:1, v/v) was used as electrolyte for half and full cells. Cycling performance and galvanostatic charge-discharge behaviors were conducted on Arbin BT300 with a voltage window ranging from 0.01 to 1.5 V (vs. Li+/Li). Capacity and C-rates were determined using 1 C=3.6 A g-1. Cyclic voltammetry scans were tested at a fixed voltage window between 0.01 V and 1.5 V (vs. Li+/Li). Electrochemical impedance spectroscopy measurements were performed to evaluate the impedance information of gSi@C anodes on a Biologic VMPs with a frequency range between 0.01 Hz and 1 MHz.

FIGURES

FIG. 1 is as schematic of the Mg reduction process using NaCl as heat scavenger.

Figure 2B:
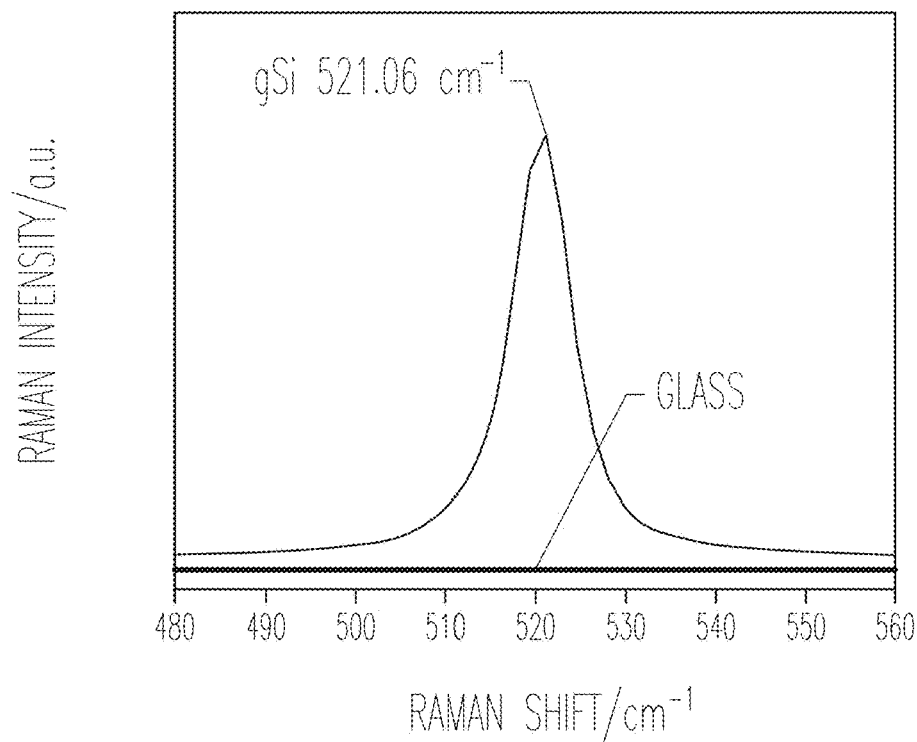
FIG. 2B depicts Raman spectra of pre-reduction milled glass powder and post-reduction gSi.
Figure 3A:
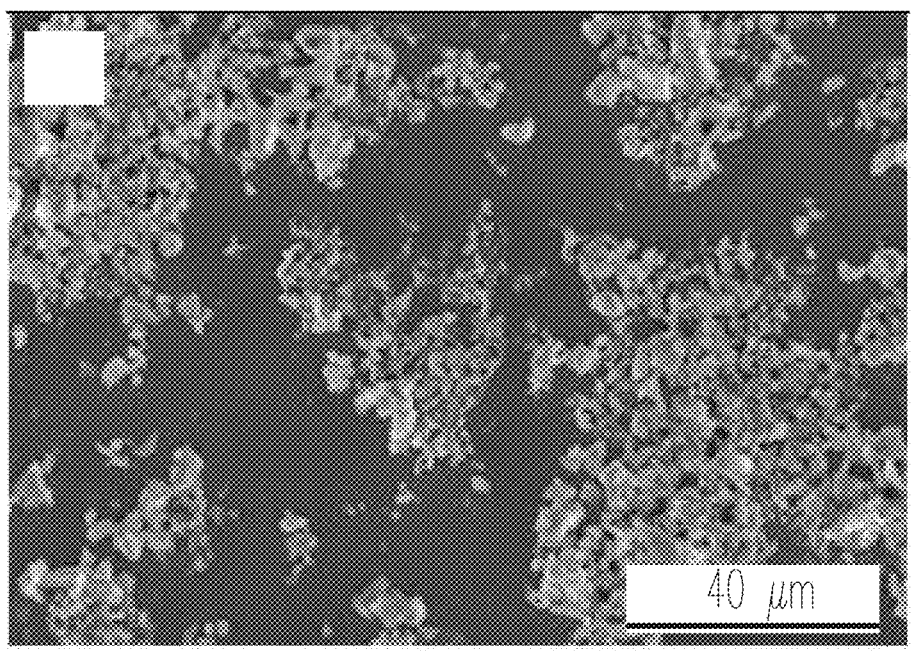
FIGS. 3A-3D show scanning electron microscope (SEM) images of gSi after reduction and acid etching.
Figure 3B:
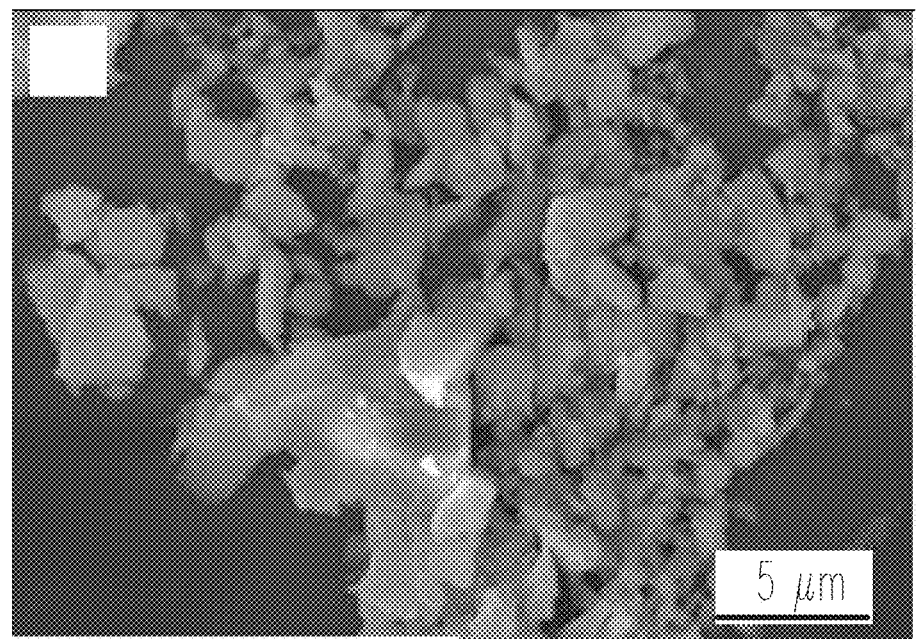
Figure 3C:
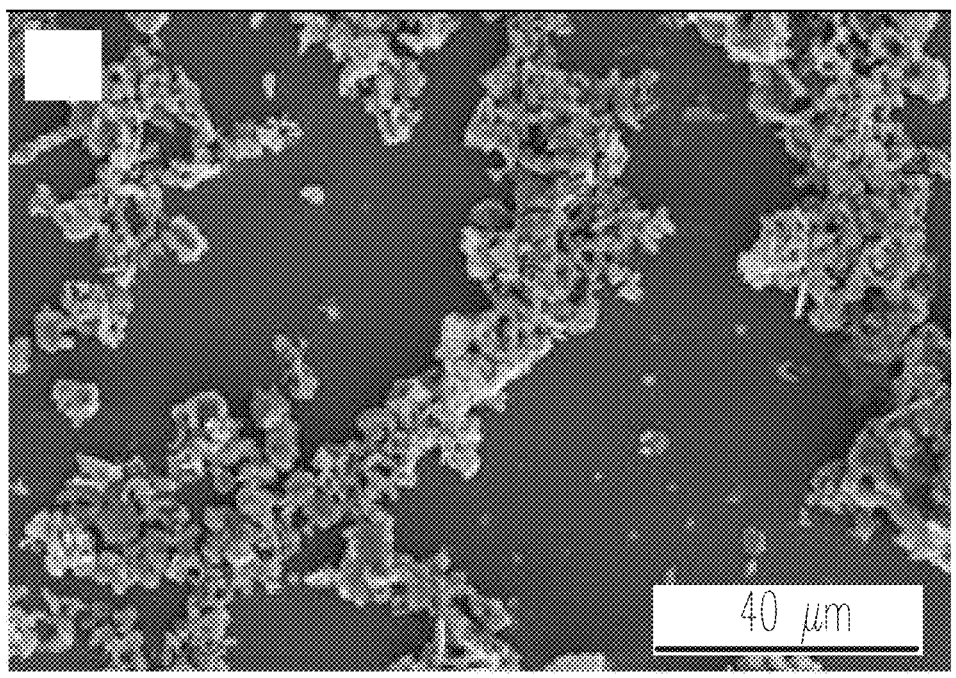
Figure 3D:
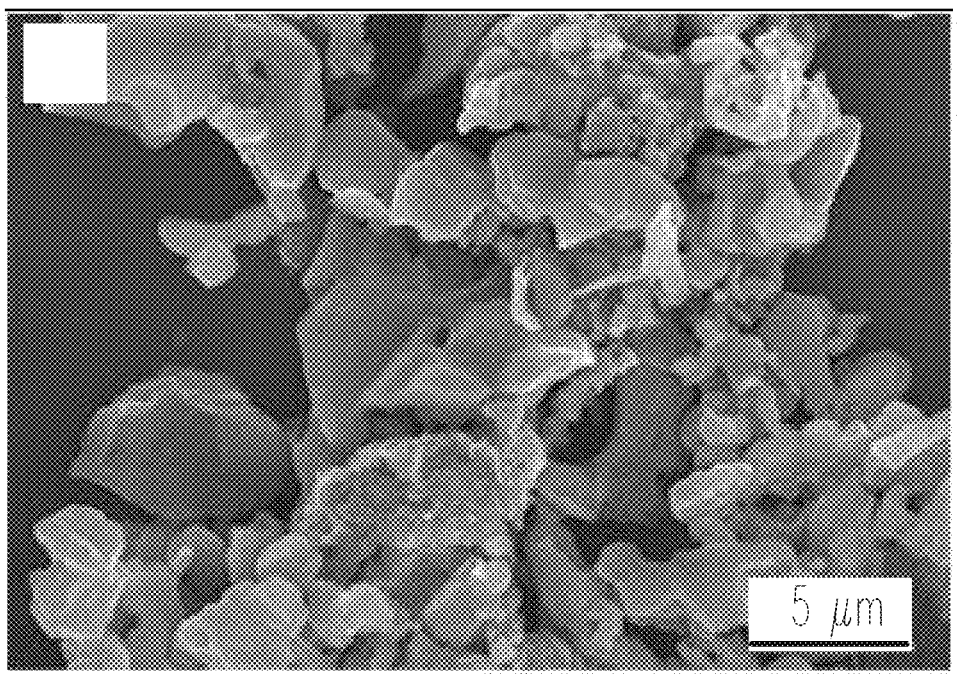

FIGS. 2A-2B show XRD patterns and Raman spectra of pre-reduction milled glass powder and post-reduction gSi.

FIGS. 3A-3D low magnification and high magnification SEM images of milled glass powder and low magnification and high magnification SEM images of gSi after reduction and acid-etching.

FIGS. 4A-4C show low magnification TEM image of gSi particles; HRTEM image of gSi showing the characteristic lattice spacing of Si; STEM-HAADF image of gSi; and EDS elemental map showing the high purity of reduced Si.

FIGS. 5A-5B are TEM images of gSi@C displaying the conformal carbon coating and the carbon layer thickness across gSi particles with low magnification and high magnification; STEM-HAADF image of carbon coated gSi particles; and EDS mapping showing the phase conformal carbon coating surrounding gSi.

FIGS. 6A-6E show cycling performance and Coulombic efficiency of gSi@C anodes at a current density of C/10; the corresponding galvanostatic charge-discharge profiles of gSi@C based half-cell; cyclic voltammetry characteristic of gSi@C anodes at scan rate: 0.2 mV $sec^{-1}$; C-rates cycling performance of gSi@C electrodes; and comparison of the cycling performance and Coulombic efficiency between gSi@C and gSi based electrodes at a higher current density of C/2.

Figure 7B:
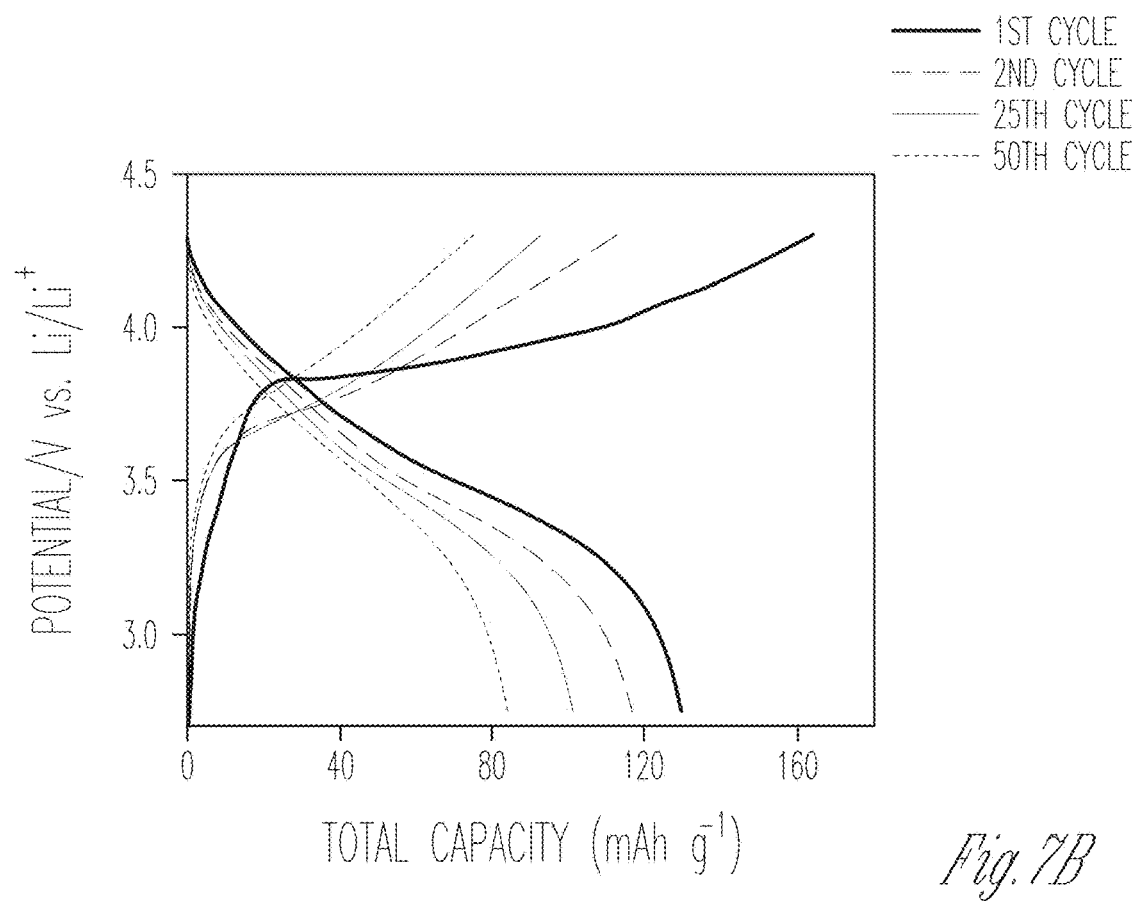

FIGS. 7A-7B show cycling performance of full cells employing gSi@C anode and $LiCoO_2$ cathode for 50 cycles; and the corresponding galvanostatic charge-discharge curves of the full cells.

Figure 8A:
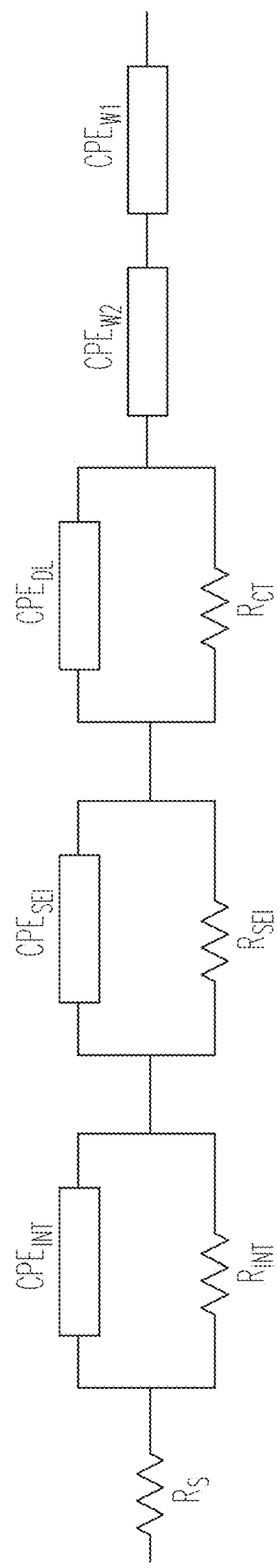
FIGS. 8A-8C show graphical representations of gSi@C electrode testing.
Figure 8B:
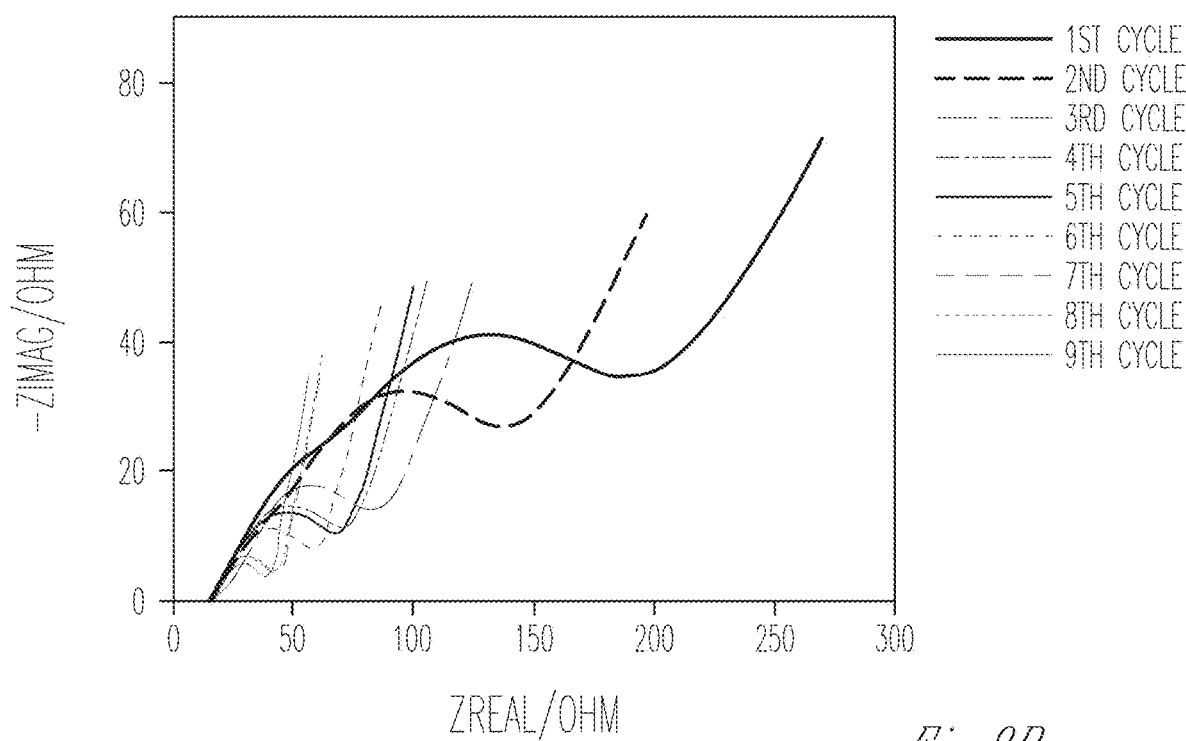
Figure 8C:
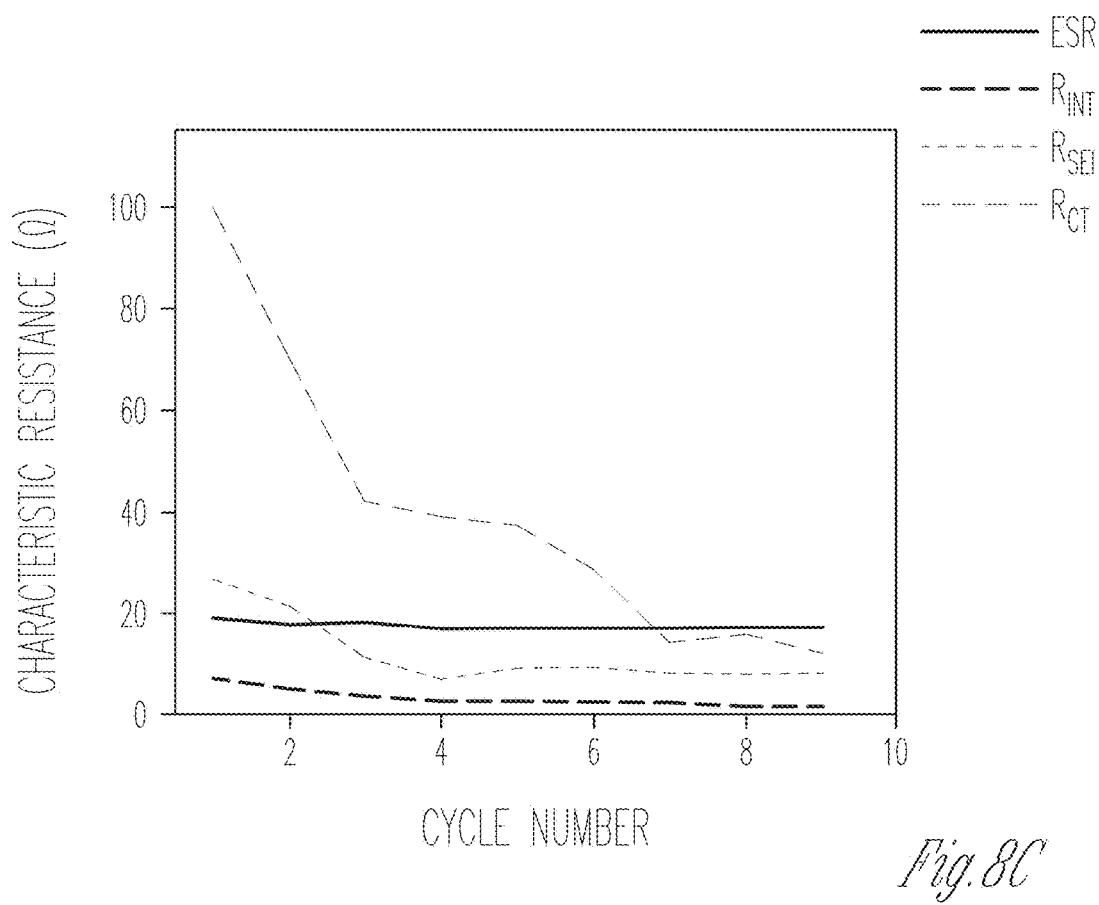

FIG. 8A shows Equivalent circuit of gSi@C based anodes used to produce fitted model data. FIG. 8B shows Nyquist plots of gSi@C half cell. FIG. 8C shows characteristic resistances for EIS measurements.

Figure 9:
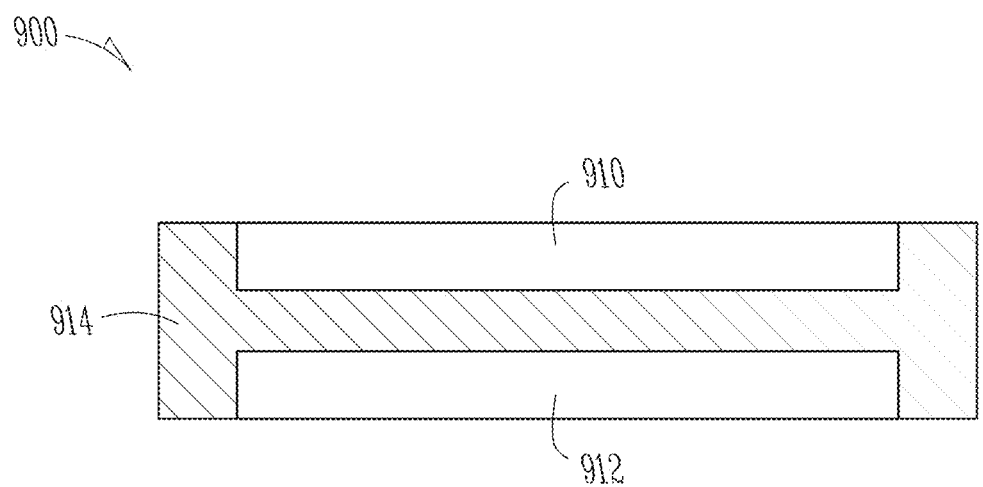
FIG. 9 shows a battery containing a gSi@C electrode.

FIG. 9 shows an example of a battery 900 according to an embodiment of the invention. The battery 900 is shown including an anode 910 and a cathode 912. An electrolyte 914 is shown between the anode 910 and the cathode 912. In one example, the battery 900 is a lithium-ion battery. In one example, the anode 910 includes sulfur as described in examples above. In one example, the cathode 912 includes silicon as described in examples above. In one example, although the invention is not so limited, the battery 900 is formed to comply with a 2032-coin type form factor.

CONCLUSION

In summary, we have demonstrated the direct conversion from glass bottles to high purity silicon using a scalable, facile and low-cost Mg reduction process. The electrochemical performance of gSi@C anodes can be mainly attributed to the mitigated volume expansion and improved system conductivity resulting from the interconnected gSi network and the conformal carbon coating. A full cell with good initial cycling stability and high energy density using gSi@C as anode and $LiCoO_2$ as cathode has been reported. The non-etching, easy-collet and abundant glass bottles as $SiO_2$ source offers a promising avenue for the large-scale production of Si based anodes.

DISCUSSION OF MULTIPLE EMBODIMENTS

To better illustrate the method and apparatuses disclosed herein, a non-limiting list of embodiments is provided here:

Embodiment 1 provides a battery electrode comprising silicon made from magnesiothermic reduction of silicon oxide derived from glass bottles and a conformal carbon coating thereon.

Embodiment 2 provides Embodiment 1, wherein the silicon comprises an interconnected three-dimensional silicon network Embodiment 3 provides Embodiment 1, wherein the silicon comprises a d-spacing of about 0.300 nm to about 0.320 nm.

Embodiment 4 provides Embodiment 1, wherein the silicon has a particle size from micro level to about 50 nm.

Embodiment 5 provides a method of making an electrode material includes crushing glass bottles to produce crushed glass containing silicon oxide particles, mixing the silicon oxide particles with a heat scavenger to produce a mixture, magnesiothermically reducing the mixture to produce silicon, and applying a carbon coat to the silicon to produce an electrode material.

Embodiment 6 provides Embodiment 5, wherein the silicon oxide particles are lightweight silicon oxide particles.

Embodiment 7 provides Embodiment 6, further comprising separating out light weight silicon oxide particles from the crushed glass.

Embodiment 8 provides Embodiment 7, wherein separating out light weight silicon oxide particles includes suspending the crushed glass in a solvent, allowing larger silicon oxide particles to settle, and collecting the light weight silicon oxide particles.

Embodiment 9 provides Embodiment 5, wherein crushing the glass bottles comprises hammering the glass bottles to produce crushed glass.

Embodiment 10 provides Embodiment 9, further comprises milling the crushed glass to produce lightweight silicon oxide particles.

Embodiment 11 provides Embodiment 5, further comprising milling the silicon oxide particles prior to mixing the silicon dioxide particles with the heat scavenger.

Embodiment 12 provides Embodiment 5, wherein the heat scavenger is sodium chloride.

Embodiment 13 provides Embodiment 5, wherein mixing the silicon oxide particles with a heat scavenger comprises milling the silicon oxide particles with the heat scavenger to produce the mixture.

Embodiment 14 provides Embodiment 13, further comprising resuspending and vacuum drying the mixture.

Embodiment 15 provides Embodiment 5, wherein magnesiothermically reducing the mixture comprises adding magnesium to the mixture and heating.

Embodiment 16 provides Embodiment 15, wherein heating is done at a range from about 650° C. to about 750° C. for about 6 hours.

Embodiment 17 provides Embodiment 5, further comprising removing excess heat scavenger and magnesium compounds.

Embodiment 18 provides Embodiment 5, further comprising removing unreacted silicon dioxide.

Embodiment 19 provides Embodiment 5, wherein applying a carbon coat comprises chemical vapor deposition.

Embodiment 20 provides A battery electrode material made by Embodiment 5.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A method of making an electrode material comprising:
   crushing glass bottles to produce crushed glass containing silicon oxide particles;
   separating out light weight silicon oxide particles from the crushed glass;
   mixing the silicon oxide particles with a heat scavenger to produce a mixture;
   magnesiothermically reducing the mixture to produce silicon, wherein the silicon comprises an interconnected three-dimensional silicon network; and
   applying a carbon coat to the silicon to produce an electrode material.

2. The method of claim 1, wherein the silicon oxide particles are lightweight silicon oxide particles.

3. The method of claim 1, wherein separating out light weight silicon oxide particles comprises:
   suspending the crushed glass in a solvent;
   allowing larger silicon oxide particles to settle; and
   collecting the light weight silicon oxide particles.

4. The method of claim 1, wherein crushing the glass bottles comprises hammering the glass bottles to produce crushed glass.

5. The method of claim 4, further comprises milling the crushed glass to produce lightweight silicon oxide particles.

6. The method of claim 1, further comprising milling the silicon oxide particles prior to mixing the silicon dioxide particles with the heat scavenger.

7. The method of claim 1, wherein the heat scavenger is sodium chloride.

8. The method of claim 1, wherein mixing the silicon oxide particles with a heat scavenger comprises milling the silicon oxide particles with the heat scavenger to produce the mixture.

9. The method of claim 8, further comprising resuspending and vacuum drying the mixture.

10. The method of claim 1, wherein magnesiothermically reducing the mixture comprises adding magnesium to the mixture and heating.

11. The method of claim 10, wherein heating is done at a range from about 650° C. to about 750° C. for about 6 hours.

12. The method of claim 1, further comprising removing excess heat scavenger and magnesium compounds.

13. The method of claim 1, further comprising removing unreacted silicon dioxide.

14. The method of claim 1, wherein applying a carbon coat comprises chemical vapor deposition.

* * * * *